(12) United States Patent
Blon et al.

(10) Patent No.: US 9,231,755 B2
(45) Date of Patent: *Jan. 5, 2016

(54) CIRCUIT ARRANGEMENT AND METHOD FOR TRANSMITTING SIGNALS

(71) Applicant: SILICON LINE GMBH, Munich (DE)

(72) Inventors: Thomas Blon, Munich (DE); Florian Jansen, Munich (DE); Martin Groepl, Sonthofen/Oberallgaeu (DE)

(73) Assignee: SILICON LINE GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,462

(22) Filed: Feb. 14, 2014

(65) Prior Publication Data
US 2015/0043691 A1     Feb. 12, 2015

Related U.S. Application Data

(63) Continuation of application No. PCT/DE2012/200053, filed on Aug. 16, 2012.

(30) Foreign Application Priority Data

Aug. 16, 2011 (DE) .............. 102011052762

(51) Int. Cl.
*H04L 7/00* (2006.01)
*H04L 7/04* (2006.01)
*H04L 25/02* (2006.01)
*H04L 25/49* (2006.01)

(52) U.S. Cl.
CPC .............. *H04L 7/048* (2013.01); *H04L 7/0091* (2013.01); *H04L 25/0272* (2013.01); *H04L 25/0276* (2013.01); *H04L 25/4902* (2013.01); *H04L 7/0008* (2013.01); *H04L 7/0075* (2013.01)

(58) Field of Classification Search
USPC .......................... 375/295, 259, 299, 288, 354
See application file for complete search history.

(56) References Cited

U.S. PATENT DOCUMENTS

2004/0156398 A1* 8/2004 Abel et al. ..................... 370/516
2007/0098112 A1  5/2007 Kim et al.
2010/0316099 A1* 12/2010 Sugita et al. .................. 375/219

OTHER PUBLICATIONS

"SL83014 by Silicon Line GmbH", Mar. 3, 2011, URL:http/www.silicon-line.com/SL83014.htm, XP055057663.
"MIPI Alliance Specification for D-PHY", Sep. 22, 2009, URL:http//www.mipi.org/specifications/physical-layer.
P. Dartnell et al., "Serdes Framer Interface Level 5 (SFI-5): Implementation Agreement for 40Gb/s Interface for Physical Layer Devices (OIF-SFI5-01.01)", Optical Internetworking Forum (OIF). URL:httplwww.oiforum.com/public/documents/OIF-SF15-01.0.pdf, Jan. 29, 2002.
International Search Report; PCT/DE2012/200053; Apr. 18, 2013.

* cited by examiner

*Primary Examiner* — Siu Lee
(74) *Attorney, Agent, or Firm* — Studebaker & Brackett PC

(57) ABSTRACT

On the basis
of single-ended signals based on logic levels, and
of differential, in particular common-mode-based, signals,
a circuit arrangement and a corresponding method are proposed, in which a full duplex data transmission is possible.

14 Claims, 5 Drawing Sheets

CIRCUIT ARRANGEMENT AND METHOD FOR TRANSMITTING SIGNALS

CROSS-REFERENCE TO RELATED APPLICATIONS

This application is a continuation of international (WO) patent application no. PCT/DE2012/200053, filed 16 Aug. 2012, which claims the priority of German (DE) patent application no. 10 2011 052 762.1, filed 16 Aug. 2011, the contents of each being hereby incorporated herein by reference.

FIELD OF THE INVENTION

The present invention relates to a circuit arrangement and to a method for transmitting both single-ended logic-level-based data signals and clock signals, and differential, in particular common-mode-based, data signals and clock signals.

BACKGROUND OF THE INVENTION

The bit transmission layer or physical layer (PHY) is the bottom layer in the O[pen]S[ystems]I[nterconnection] layer model, also called OSI reference model and denotes a layer model of the International Standards Organisation (ISO) which in turn serves as a design basis for communication protocols in computer networks.

The physical layer (PHY) is responsible for Combining, F[orward]E[rror]C[orrection], modulation, power control, spreading (C[ode]D[ivision]M[ultiple]A[ccess]) and the like and knows neither data nor applications, only zeros and ones. PHY makes logical channels (transport channels for U[niversal]M[obile]T[elecommunications]S[ystem]) available to the security layer (D[ata]L[ink]L[ayer]) above it, in particular to a partial layer called M[edia]A[ccess]C[ontrol] Layer.

In principle D-PHY provides a flexible, low-cost and quick serial interface for communication links between components within a mobile device.

As illustrated in FIG. 5A, in modern mobile phones a data source, for example an application processor, provides image data as D-PHY signals to the M[obile]I[ndustry]P[rocessor]I[nterface]-D[isplay]S[erial]I[nterface] for display on a connected data sink, for example on a connected display. Also, a data sink can receive, via a MIPI-C[amera]S[erial]I[nterface], image data in D-PHY format from a connected data source, such as from a connected camera.

A DSI or DSI-2 or CSI or CSI-2 or CSI-3 based on the D-PHY protocol comprises up to four differential data lines and a differential clock line, which electrically connect the application processor by means of a copper cable with the display and/or with the camera. The data rate per differential data line is up to 1.5 Gbps (Gigabit per second).

This conventional sending and receiving of the D-PHY-DSI signals or the D-PHY-CSI signals via one to four differential data signals and a differential clock line is illustrated by way of example in the D-PHY interface configuration of FIG. 5B by way of two bidirectional data channels (=so called data lanes CH0+, CH0− and CH1+, CH1−) and a clock line (=so called clock lane CLK+, CLK−) between the modules of the master side (=data source, for example camera and/or application processor) and the modules of the slave side (=data sink, for example application processor and/or display unit). In the bidirectional multiple data lane configuration the abbreviation PPI in FIG. 5B stands for PHY Protocol Interface.

In this context, as can be seen in FIG. 5A, up to ten copper lines are required for data transmission for each connected display or for each connected camera (for example four times two data lines and one time two clock lines). Correspondingly high-resolution screens, television sets or cameras for example comprise an electrical M[obile]I[ndustry]P[rocessor]I[nterface]-D-PHY-data transmission interface.

This interface is used to transmit both H[igh]S[peed] data and L[ow]P[ower] data, wherein the data rate of the LP data is typically very much less than die data rate of the HS data. This is shown by way of FIG. 4, in which the respective voltage levels are shown for HS data transmission and for LP data transmission.

In this context the guidelines of the M[obile]I[ndustry]P[rocessor]I[nterface] D-PHY standard are mandatory for the transmission of H[igh]S[peed]−/L[ow]P[ower] data. L[ow]P[ower] data must obey a MIPI-specific protocol, which does not permit to transmit already established industry standards for the transmission of serial data with a small bandwidth, such as for example I2C (=Inter-Integrated Circuit), S[erial]P[eripheral]I[nterface] or other protocols, for although the last mentioned protocols have a need for the transmission of D-PHY-H[igh]S[peed] data, they in addition also require the transmission of further binary data which are not PHY-conform.

In particular the relevant MIPI standard permits albeit the transmission of L[ow]P[ower] data bidirectionally, but not bidirectionally at the same time, i.e. not full duplex (=duplex transmission), but only half duplex (=alternating transmission).

Therefore, if apart from L[ow]P[ower] data conforming to MIPI-D-PHY serial data is to be transmitted in addition which does not conform to the MIPI-Standard, even conveniently in full duplex (=duplex transmission), two or three separate electrical lines must for example be provided in known D-PHY systems for conveying the L[ow]P[ower] data not conforming to MIPI-D-PHY.

In some applications this may lead to geometric problems or space problems when the cables are run; such as in the following applications:
mobile phones with small links or
endoscopes which in view of their intended purpose should by nature have a minimal diameter throughout.

Such separate lines also lead to problems, because their normally unipolar data lines irradiate electromagnetic energy.

OBJECTS AND SUMMARY OF THE INVENTION

Starting from the above-explained disadvantages and inadequacies as well as taking the outlined prior art into account the object of the present invention is to further develop a circuit arrangement of the above-mentioned type and a method of the above-mentioned type in such a way that full duplex transmission is possible.

This object is achieved by a circuit arrangement according to the invention with the herein described features and by a method according to the invention with the herein described features. Advantageous embodiments and expedient developments of the present invention are described above and below.

This object is achieved by a circuit arrangement for transmitting both
single-ended logic-level-based data signals and clock signals, and
differential, in particular common-mode-based, data signals and clock signals between at least one transmission arrangement assignable to at least one data source and at least one receiving arrangement assignable to at least one data sink in the form of at least one common signal stream serialising the single-ended, logic-level-based data and clock signals and the differential data and clock signals and/or in the form of at least one, in particular bidirectional, signal stream effected for example on the basis of full-duplex, which comprises both the differential data and clock signals and, in particular further, binary signals.

This object is further achieved by an embodiment of the circuit arrangement according to the invention, wherein the common signal stream can be transmitted via at least one optical medium, in particular via at least one optical waveguide, for example via at least one glass fibre or at least one plastic fibre.

This object is further achieved by an embodiment of the circuit arrangement according to the invention, wherein the signal stream comprising both the differential data signals and clock signals and the binary signals can be transmitted via at least one electrical or galvanic, in particular one-bit-wide, link, in particular via at least one electrical line arranged on at least one printed circuit board.

This object is further achieved by an embodiment of the circuit arrangement according to the invention, wherein the electrical or galvanic link in the transmission arrangement has assigned to it at least one transmission/receiving module and in the receiving arrangement has assigned to it at least one transmission/receiving module, by means of which the signal stream comprising both the differential data and clock signals and the binary signals can be delivered/received.

This object is further achieved by an embodiment of the circuit arrangement according to the invention, wherein the transmission/receiving module, in particular in its function as a transmission module, comprises:

at least one multiplexer for serialising the differential data and clock signals and the binary signals at least one binary P[ulse]W[idth]M[odulation] converter downstream of the multiplex for changing the serialised signal stream from a binary N[on]R[eturn-to]Z[ero] format into a pulse-width-modulated format, at least one line driver downstream of the binary P[ulse]W[idth]M[odulation] converter and at least one terminating resistor downstream of the line driver.

This object is further achieved by an embodiment of the circuit arrangement according to the invention, wherein the transmission/receiving module, in particular in its function as a receiving module, comprises:

at least one differential amplifier downstream of the terminating resistor for subtracting at least two signals separated by the terminating resistor, and in particular weighted in a ratio of 1:2, at least one P[ulse]W[idth]M[odulation] binary converter downstream of the differential amplifier for changing from pulse-width-modulated format into binary N[on]R[eturn-to]Z[ero] format and at least one demultiplexer downstream of the P[ulse]W[idth]M[odulation] binary converter for deserialising into the differential data and clock signals and the binary signals.

This object is further achieved by an embodiment of the circuit arrangement according to the invention, wherein the transmission arrangement comprises:

at least one input for the data and clock signals, at least one transmission interface logic downstream of the input for picking up the data and clock signals, at least one serialiser downstream of the transmission interface logic for generating the common signal stream, at least one clock generator, in particular phase-locked-loop, for example clock multiplier unit, provided downstream of a clock module of the transmission interface logic, upstream of the serialiser and for generating at least one reference clock, at least one output driver downstream of the serialiser and at least one output downstream of the output driver for transmitting the common signal stream to the receiving arrangement.

This object is further achieved by an embodiment of the circuit arrangement according to the invention, wherein the serialiser comprises:

at least one framer downstream of the transmission interface logic for generating at least one frame recognisable in the receiving arrangement for the common signal stream as well as at least one multiplexer downstream of the framer for generating the common signal stream.

This object is further achieved by an embodiment of the circuit arrangement according to the invention, wherein both the single-ended, logic-level-based data signals and the differential data signals can be applied to the framer and in that the framer, by means of at least one coder, in particular by means of at least one 5b/6b coder block, embeds the differential data signals in the stream of the single-ended, logic-level-based data signals.

This object is further achieved by an embodiment of the circuit arrangement according to the invention, wherein the receiving arrangement comprises:

at least one input for the common signal stream transmitted by the transmission arrangement, at least one input amplifier for picking up the common signal stream, at least one clock and data recovery unit for recovering the data signals and clock signals from the common signal stream, at least one clock module of at least one receiving interface logic downstream of the clock and data recovery unit, at least one deserialiser downstream of the clock and data recovery unit for re-parallelising the data signals and for assigning the re-parallelised data signals to the receiving interface logic and at least one output downstream of the receiving interface logic for the data signals and clock signals.

This object is further achieved by an embodiment of the circuit arrangement according to the invention, wherein the deserialiser comprises:

at least one demultiplexer downstream of the clock and data recovery unit for re-parallelising the data signals as well as at least one deframer downstream of the demultiplexer for assigning the re-parallelised data signals to the receiving interface logic.

This object is further achieved by an embodiment of the circuit arrangement according to the invention, wherein the deframer separates the differential data signals by means of at least one decoder, in particular by means of at least one 6b/5b decoder block, from the single-ended, logic-level-based data signals and assigns the re-parallelised data signals to the respective data lines.

This object is further achieved by a method for transmitting both
- single-ended logic-level-based data signals and clock signals, and
- differential, in particular common-mode-based, data and clock signals, between at least one transmission arrangement assignable to at least one data source and at least one receiving arrangement assignable to at least one data sink
- in the form of at least one common signal stream serialising the single-ended, logic-level-based data and clock signals and the differential data and clock signals and
- in the form of at least one, in particular bidirectional, signal stream on full-duplex basis, comprising both the differential data and clock signals and, in particular further, binary signals.

This object is further achieved by an embodiment of the method according to the invention, wherein the differential data and clock signals and the binary signals are scanned at different frequencies, in particular in that the differential data and clock signals are scanned eight times more frequently than the binary signals.

This object is further achieved by a use of the circuit arrangement and/or of the method according to the invention during serial and/or bundled, in particular CSI protocol-based and/or CSI-2 protocol-based and/or CSI-3 protocol-based and/or DSI protocol-based and/or DSI-2 protocol-based transmission of both single-ended logic-level-based data and clock signals and differential, in particular common-mode-based, data signals and clock signals, in particular D-PHY data signals and D-PHY clock signals, for example up to 4-bit-wide MIPI-D-PHY data signals and MIPI-D-PHY clock signals, between at least one data source, in particular at least one e.g. high-resolution camera acting e.g. as an image source and/or at least one application processor, and at least one data sink, in particular at least one application processor and/or at least one e.g. high-resolution display unit and/or a display unit acting e.g. as an image sink, for example at least one display or at least one monitor.

A circuit arrangement and a method are therefore proposed, by means of which
- the single-ended L[ow]P[ower] data corresponding to signals based on logic levels and
- the differential H[igh]S[peed] data corresponding to signals based in particular on common mode signals
are serialised to form a common signal stream.

In addition to this common serialised signal stream a full duplex data transmission for the L[ow]P[ower] data and at the same time for a further number of general binary data is made possible, bundled via at least one additional electrical or galvanic link, in particular via at least one additional copper cable and/or via an additional electrical line arranged for example on at least one printed circuit board.

The present invention can be typically applied during serial and/or bundled, in particular CSI-protocol-based and/or CSI-2-protocol-based and/or CSI-3-protocol-based and/or DSI-protocol-based and/or DSI-2-protocol-based transmission of both single-ended logic-level-based data and clock signals and differential, in particular common-mode-based data and clock signals, in particular D-PHY data signals or D-PHY clock signals, for example one-to-four-bit wide MIPI-D-PHY data signals and MIPI-D-PHY clock signals, between at least one data source, in particular at least for example a high-resolution camera and/or a camera acting as an image source and/or at least one application processor, and at least one data sink, in particular at least one application processor and/or at least one high-resolution display unit or a display unit acting for example as an image sink, for example at least one display or at least one monitor.

BRIEF DESCRIPTION OF THE DRAWINGS

As already discussed above, there are various possibilities for embodying and further developing the teaching of the present invention in an advantageous manner. For this purpose, on the one hand reference is made to the explanations above and to the dependent claims, and on the other hand further embodiments, features and advantages of the present invention are explained in greater detail below, inter alia by way of the exemplary embodiments illustrated by FIG. 1A to FIG. 4.

It is shown in.

Like or similar embodiments, elements or features are provided with identical reference numerals in FIG. 1A to FIG. 5B.

DETAILED DESCRIPTION OF THE INVENTION

Figure 1A:
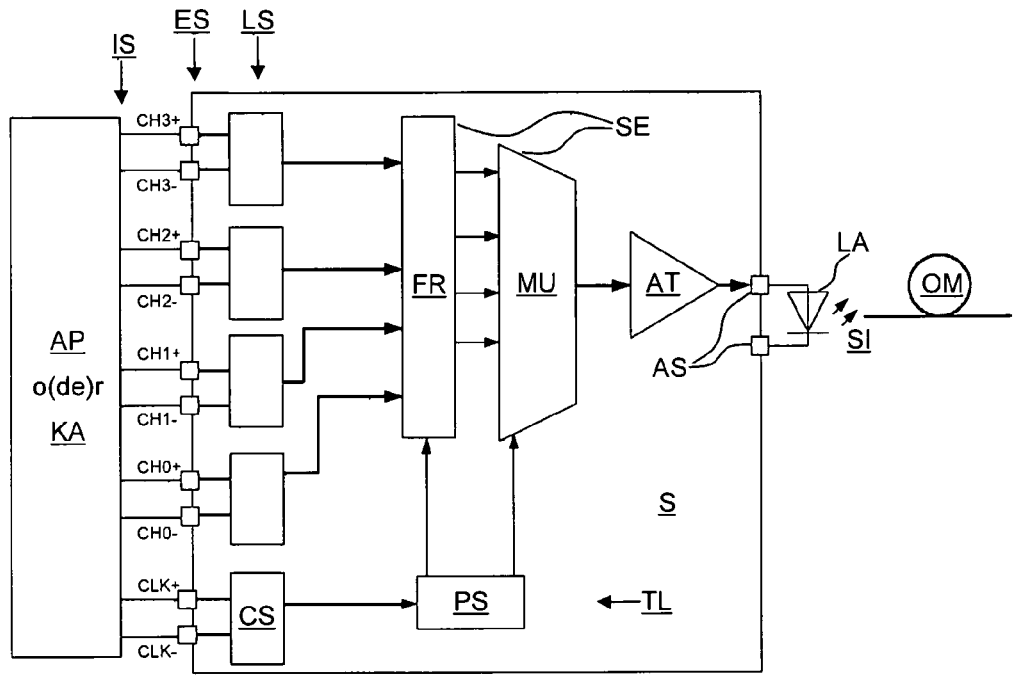
FIG. 1A in a conceptual schematic illustration an embodiment of the transmission arrangement according to the present invention, which operates according to the method of the present invention.
Figure 2A:
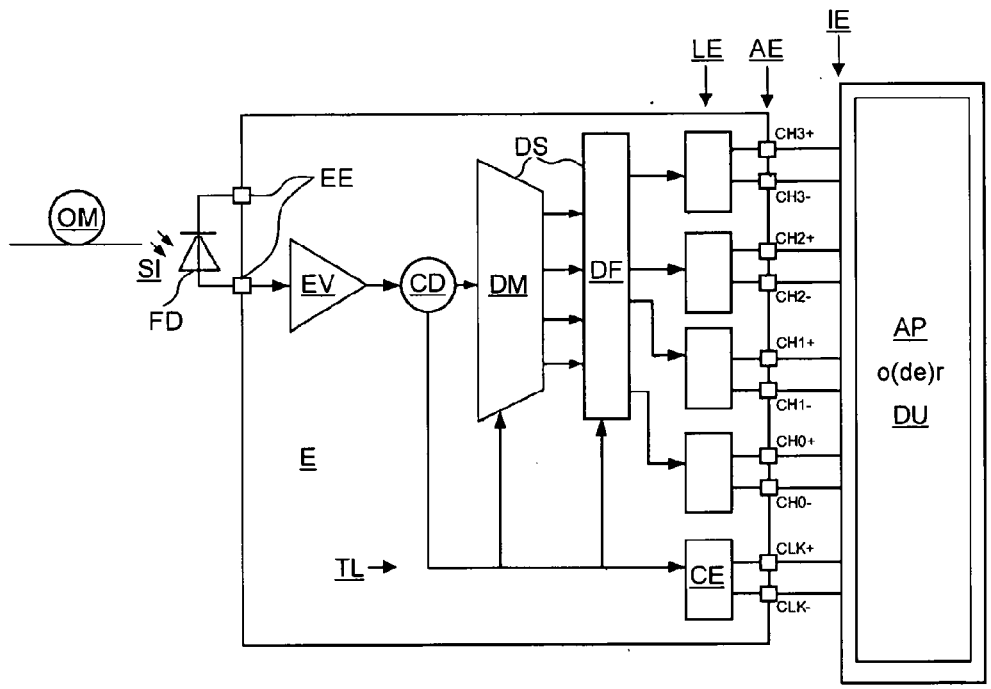
FIG. 2A in a conceptual schematic illustration an embodiment of the receiving arrangement associated with the transmission arrangement of FIG. 1A, which operates according to the method of the present invention.

In principle it is possible,
- by means of the embodiment shown in FIG. 1A of a transmission arrangement S according to the present invention and
- by means of an embodiment shown in FIG. 2A of a receiving arrangement E according to the present invention,
which together result in an embodiment of a circuit arrangement A (see FIG. 3) according to the present invention (in terms of the present invention, it is possible, to realise and to operate the transmission arrangement S and the receiving arrangement E independently of each other), to optionally realise and to operate a cable-based link which has been multiplexed and thus serialised on an optical basis, in particular on the basis of at least one optical medium, for example on the basis of an optical waveguide OM (see detail illustrations in FIG. 1A, FIG. 2A), such as on the basis of at least one glass fibre and/or on the basis of at least one plastic fibre and/or which has not been multiplexed on an electrical or galvanic basis, in particular on the basis of at least one electrical or galvanic link GA, (see FIG. 3), for example on the basis of at least one copper cable and/or on the basis of at least one electrical line such as arranged on at least a printed circuit board.

FIG. 1A shows an embodiment of the principal construction of a transmission arrangement S for connection to a D[isplay]S[erial]I[nterface] data transmission interface IS or a C[amera]S[erial]I[nterface]—data transmission interface IS.

The image data generated in the application processor AP or in the camera KA are made available on four data lines or channels CH0+, CH0−, CH1+, CH1−, CH2+, CH2−, CH3+, CH3− as D-PHY signals at the up-to-four-bit-wide data transmission interface IS together with the D-PHY correct clock signals CLK+, CLK−.

The transmission arrangement S picks these signals up at an integrated Interface Logic LS, the blocks of which can prove that they have at least one state machine for correct interpretation of the D-PHY signals and for differentiating between high-frequency data streams (so-called H[igh]S[peed] data corresponding to single-ended logic-level-based signals) and low-frequency data streams (so-called L[ow]S[peed] data corresponding to differential, in particular common-mode-based signals).

A framer FR following in the transmission arrangement S (see also detail view in FIG. 1B) ensures D[irect]C[urrent] balancing of the input signal and generates a frame recognisable on the receiving side (see FIG. 2A), which allows the receiving arrangement E (see FIG. 2A) to re-assign the received data to the correct output data lines or output channels CH0+, CH0−, CH1+, CH1−, CH2+, CH2−, CH3+, CH3−.

Figure 1B:
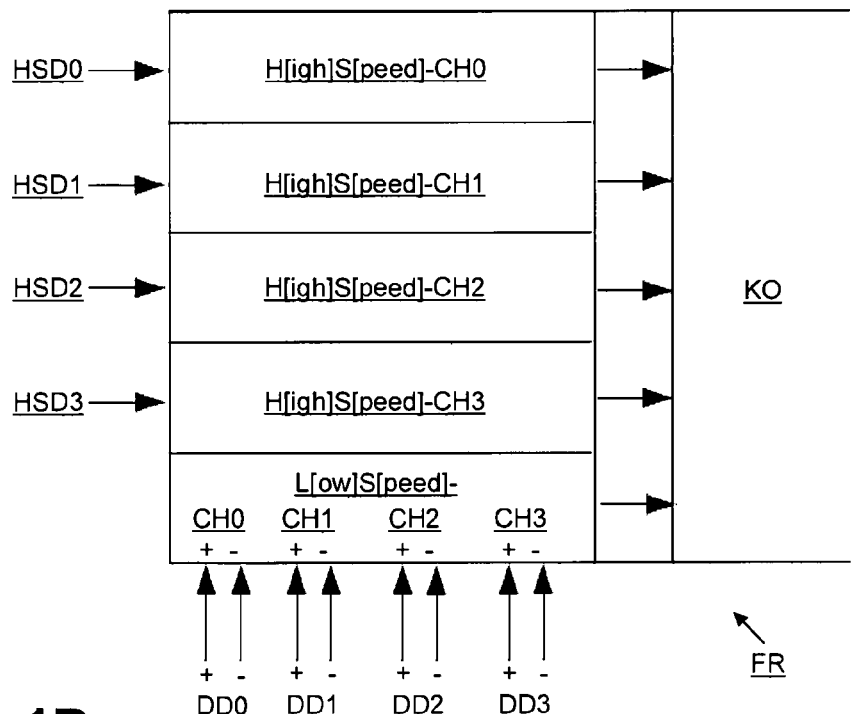
FIG. 1B in a conceptual schematic illustration a detail view of an embodiment of the framer of the transmission arrangement in FIG. 1A.

In detail both the logic-level-based single-ended data signals HSD0, HSD1, HSD2, HSD3 and the differential data signals DD0+, DD0−, DD1+, DD1−, DD2+, DD2−, DD3+, DD3− can be applied to the framer FR according to FIG. 1B. By means of its coder KO configured as a 5b/6b coding block the framer according to FIG. 1B embeds these differential data signals DD0+, DD0−, DD1+, DD1−, DD2+, DD2−, DD3+, DD3− into the stream of the single-ended logic-level-based data signals HSD0, HSD1, HSD2, HSD3.

A multiplexer MU, in particular H[igh]S[peed] Mux, adjoining the frame FR, uses a clock generator PS configured as a phase-locked-loop, in particular as a C[lock]M[ultiplier]U[nit], to generate the high-frequency serial or bundled transmission signal, which is made available at the output AS of the transmission arrangement S by means of an output driver AT. The framer FR and the multiplexer MU together form the serialiser SE.

The D-PHY clock signal provided via the clock port CLK+, CLK− and via the clock module CS of the interface logic LS by means of clock generator PS is used as (clock) reference for the serialiser SE, in particular for its multiplexer MU, and is embedded into the serial data stream, i.e. into the serialised output signal. This creates the common signal stream SI which is communicated to the receiving arrangement E (see FIG. 2A).

As can further be seen in FIG. 1A, the output driver AT is implemented as an integrated laser driver for driving at least one directly connected laser LA, in particular for driving at least one V[ertical]C[avity]S[urface]E[mitting]L[aserdiode].

FIG. 2A shows an embodiment for the principal construction of a receiving arrangement E for connection to a D[isplay]S[erial]I[nterface] data transmission interface IE or also a C[amera]S[erial]I[nterface] data transmission interface IE.

The serial or bundled data sent out by the transmission arrangement S (see FIG. 1A) is picked up via an input amplifier EV of the receiving arrangement E and supplied to an integrated clock or data recovery CD.

This integrated clock or data recovery CD regenerates the original D-PHY clock from the common signal stream SI, which is then made directly available again to the D[isplay]S[erial]I[nterface] or the C[amera]S[erial]I[nterface] via the clock module CE of the interface logic LE. The remaining serial data stream is debundled and parallelised via a demultiplexer DM and handed over to a deframer DF (see also detail in FIG. 2B), which in principle is the mirror image of framer FR according to FIG. 1B. The demultiplexer DM and deframer DF together form the deserialiser DS.

Figure 2B:
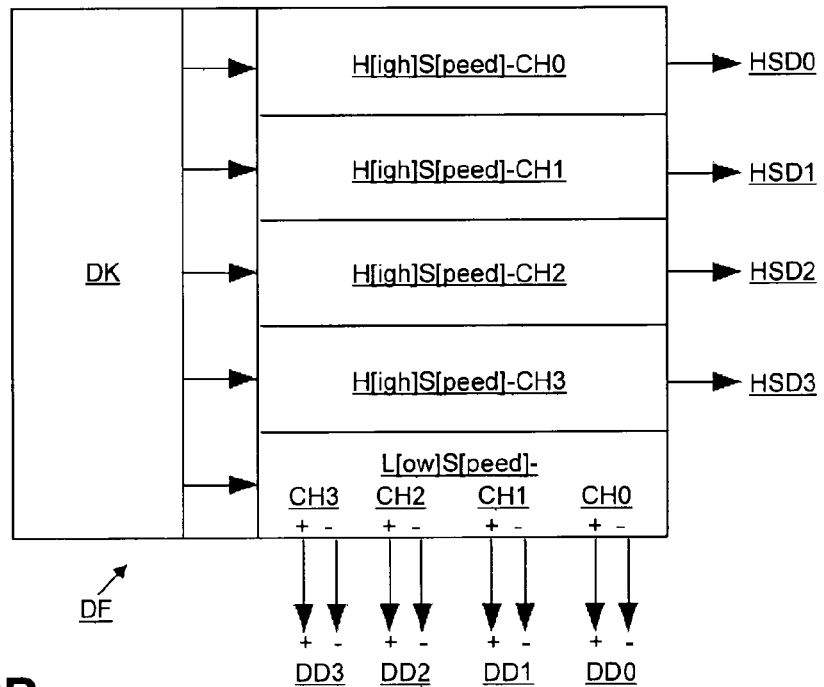
FIG. 2B in a conceptual schematic illustration a detail view of an embodiment of the deframer of the receiving arrangement of FIG. 2A.

In detail the deframer FR of FIG. 2B, by means of its decoder DK configured as a 6b/5b decoder block, can separate the differential data signals DD0+, DD0−, DD1+, DD1−, DD2+, DD2−, DD3+, DD3− from the single-ended, logic-level-based data signals HSD0, HSD1, HSD2, HSD3 and re-assign the re-parallelised data signals to the respectively applicable data lines CH0+, CH0−, CH1+, CH1−, CH2+, CH2−, CH3+, CH3−.

The interface logic blocks LE shown in the receiving arrangement E may comprise at least one state machine respectively for correct interpretation of the D-PHY logic signals and for differentiating between high-frequency data streams and low-frequency data streams.

As can also be seen in the illustration in FIG. 2A, the input amplifier EV is implemented as an integrated transimpedance amplifier, which allows a photo diode FD to be directly connected to the receiving arrangement E.

In this way, with regard to the circuit arrangement A (see FIG. 3), it is possible according to the invention to realise and to operate the cable-based multiplexed link between the transmission arrangement S (see FIG. 1A) and the receiving arrangement E (see FIG. 2A) on an optical basis, i.e. by means of an optical waveguide OM configured e.g. in form of a glass fibre and/or in form of a plastic fibre.

FIG. 3 represents an embodiment for the overall view of the transmission arrangement S (see FIG. 1A) and the receiving arrangement E (see FIG. 2A). This is a D-PHY transmission path with a serial link or with a serialised data stream.

To this end the D-PHY-H[igh]S[peed]/L[ow]P[ower] data is bundled by the transmission arrangement S (see FIG. 1A) comprising essentially the serialiser SE and in particular the multiplexer MU, and transmitted as a serial data stream to the receiving arrangement E (see FIG. 2A).

This receiving arrangement E (see FIG. 2A) essentially comprising the deserialiser DS, and here in particular the demultiplexer DM, debundles the serial data and re-outputs it in the original form as D-PHY-H[igh]S[peed]/L[ow]P[ower] data. The D-PHY-CL[oc]K applied to the transmission arrangement S (see FIG. 1A) is used as clock reference for the serialiser SE and is embedded in the serial data stream. The receiving arrangement E (see FIG. 2A) regenerates this clock and re-outputs it as D-PHY-CL[oc]K.

A separate galvanic link GA in the form of a copper cable or in the form of for example an electrical line arranged for example on a printed circuit board is available for conveying the D-PHY-L[ow]P[ower] data of at least one D-PHY-Lane. According to the invention this galvanic link GA is used for the purpose of transmitting both the D-PHY-L[ow]P[ower] data normally transmitted on this twisted pair and further data PD.

Figure 3A:
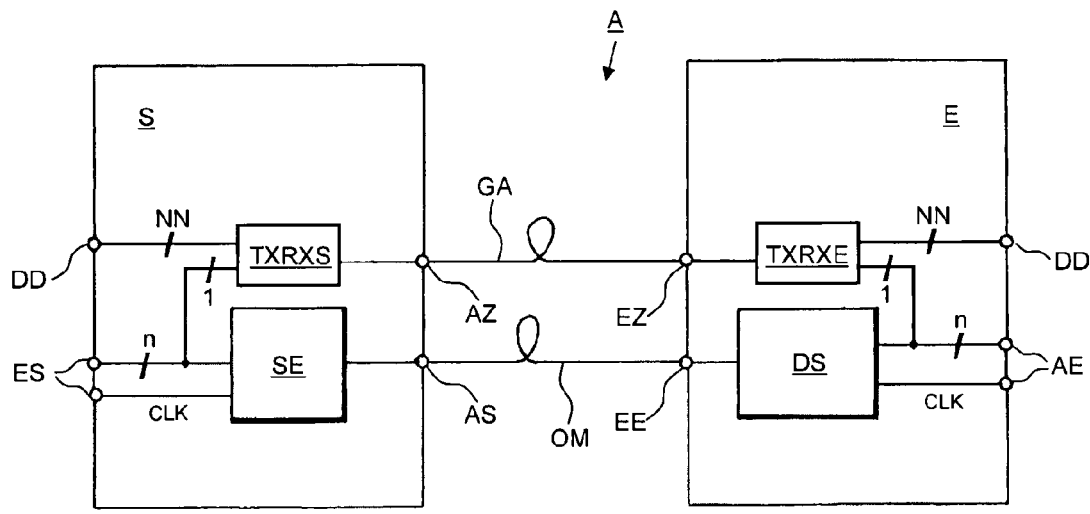
FIG. 3A in a conceptual schematic illustration an embodiment of the circuit arrangement according to the present invention, which operates according to the method of the present invention.

For this purpose both the transmission arrangement S (see FIG. 1A) adjacent to the multiplexer MU and the receiving arrangement E (see FIG. 2A) adjacent to the demultiplexer DM for the bundled D-PHY-H[igh]S[peed]–/L[ow]P[ower] data also comprise a transmission/receiving module TXRXS/ TXRXE (not shown in FIG. 1A or in FIG. 2A merely for reasons of clarity of the illustration), as can be seen in FIG. 3A.

This transmission/receiving module TXRXS/TXRXE bundles the data of a D-PHY-Lane, which is in L[ow]P[ower] mode, together with a number NN of other parallel PD data. The latter PD data can now, together with the L[ow]P[ower] data of a D-PHY-lane, be transmitted full duplex between the transmission arrangement S (see FIG. 1A) and the receiving arrangement E (see FIG. 2A), wherein the names 'transmission arrangement' and 'receiving arrangement' shall denote the unidirectional transmission function from the multiplexer MU to the demultiplexer DM.

Figure 3B:
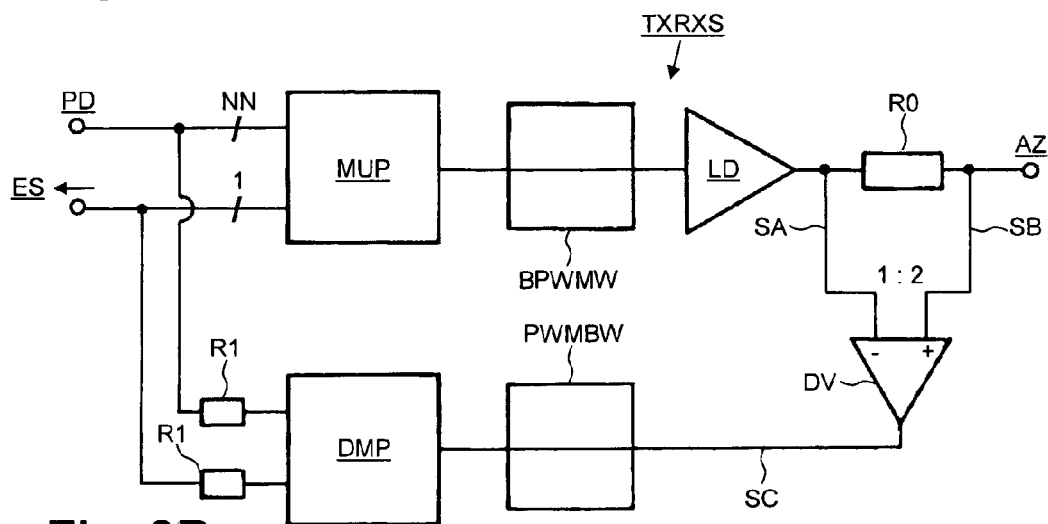
FIG. 3B in a conceptual schematic illustration an embodiment of the transmission/receiving module contained in both the transmission arrangement and the receiving arrangement, in the circuit arrangement according to FIG. 3A.

As shown in FIG. 3B, the transmission/receiving module TXRXS/TXRXE again comprises a multiplexer MU, which bundles the L[ow]P[ower] data and the PD data and drives them to the transmission/receiving module TXRXS/TXRXE of the opposite side by means of the line driver LD downstream of the multiplexer MUP.

At the same time a differential amplifier DV upstream of a demultiplexer DMP subtracts signals SA and SB weighted in a ratio of 1:2, with the result that a transmission signal imprinted by the opposite side can be separated from the local transmission signal. The signal SC obtained in this way after the differential amplifier DV is supplied to the demultiplexer DMP, which breaks up the received serial data stream after the L[ow]P[ower] signals and the signals PD.

Figure 3C:
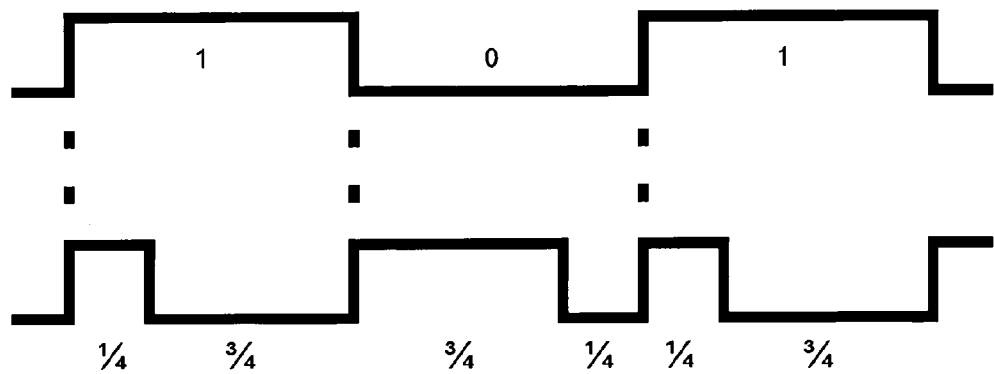
FIG. 3C in a diagrammatic illustration an embodiment of the P[uls]W[eiten]M[odulation], which can be performed by means of the binary P[uls]W[eiten]M[odulation] converter contained in the transmission/receiving module of FIG. 3B FIG. 4 in a diagrammatic illustration an embodiment of the respective voltage levels for H[igh]S[peed] data transmission and for L[ow]P[ower] data transmission.
Figure 4:
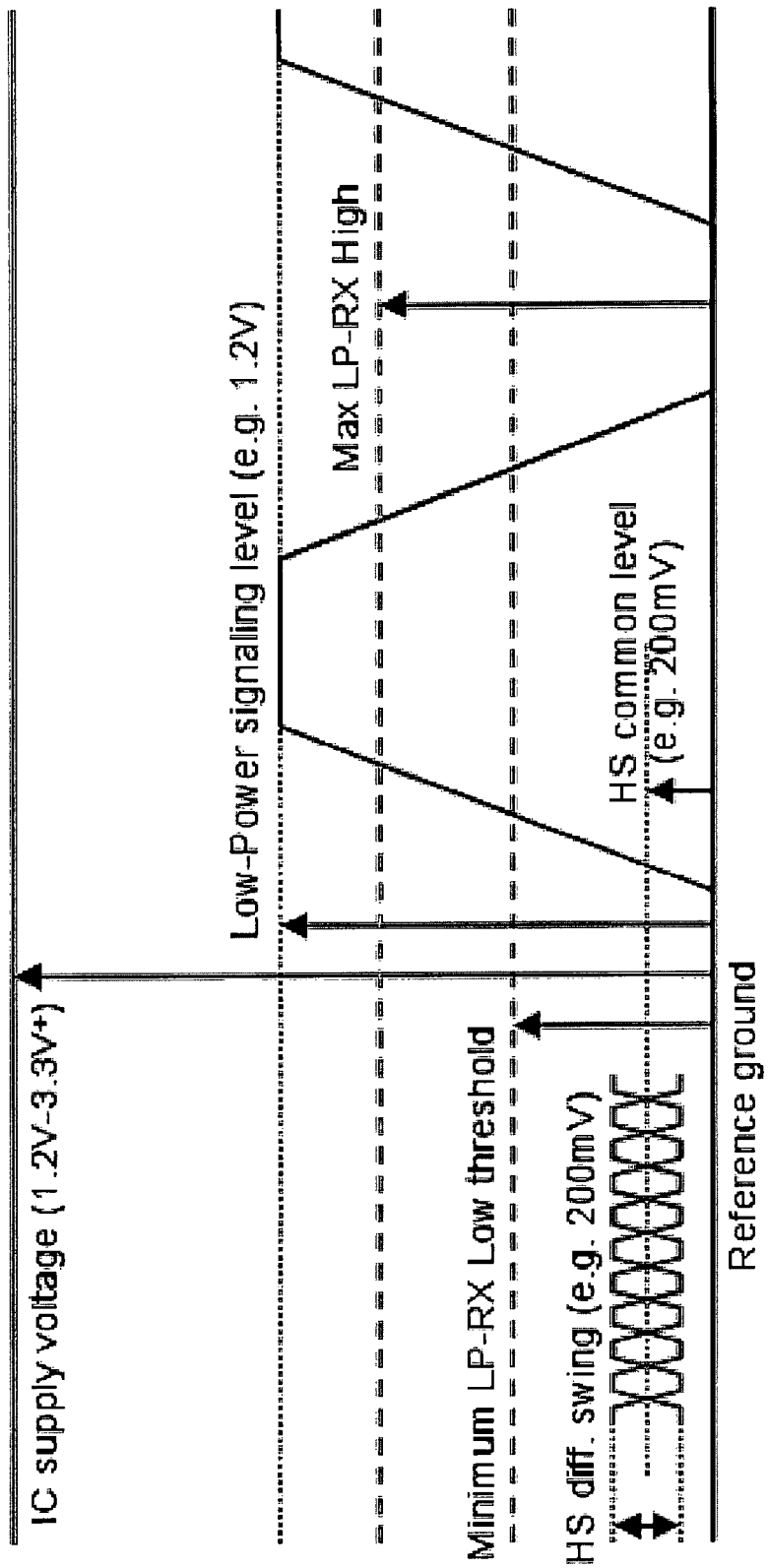
Figure 5A:
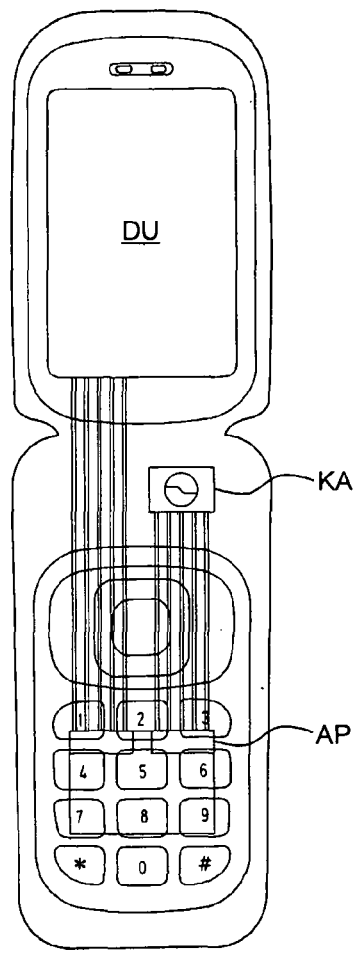
FIG. 5A in a conceptual schematic illustration a typical arrangement from the prior art.
Figure 5B:
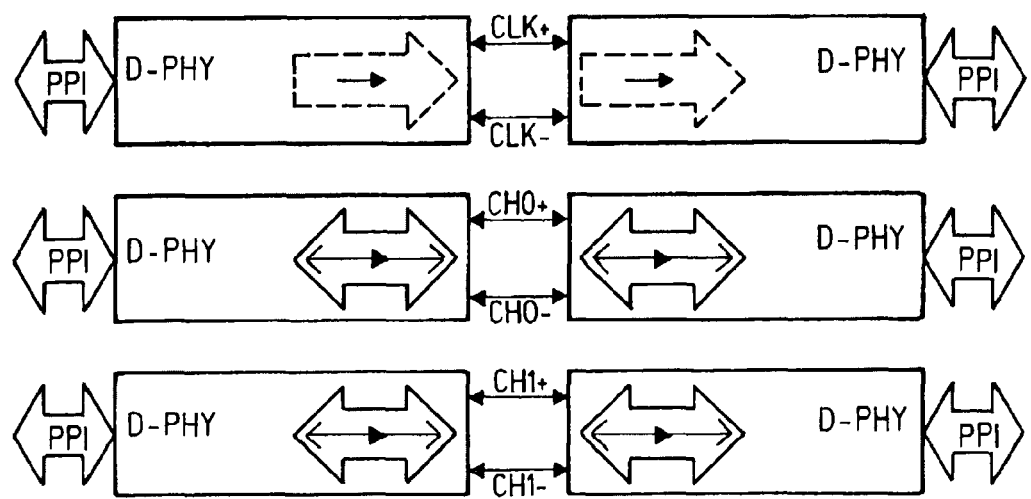
FIG. 5B in a conceptual schematic illustration an example of an interface configuration with two data channels and a clock line, on which the arrangement shown in FIG. 5A is based.

So as to allow the signals between the additional output AZ of the transmission arrangement S and the additional input EZ of the receiving arrangement E in FIG. 3A to be transmitted without having to run a separate clock line, the data from the line driver LD are changed by means of a binary /P[ulse]W [idth]M[odulation] converter BPWMW from a binary N[on] R[eturn-to]Z[ero] format into a pulse-width-modulated signal as shown in FIG. 3C (upper line in FIG. 3C: binary signal; upper line in FIG. 3C: pulse-width-modulated signal).

Analogously the received signals SC are subjected by means of a P[ulse]W[idth]M[odulation]/binary converter PWMBW to the opposite process of conversion from P[uls] W[eiten]M[odulation] into binary NRZ format.

The data LP and PD, as shown in FIG. 3B, can be scanned at different frequencies. As such the data LP can be scanned eight times more frequently than the data PD, thereby increasing the effective data rate for L[ow]P[ower] in comparison to other data.

The electrical or galvanic link GA between ports AZ and EZ in FIG. 3A may be implemented as a differential line. On the one hand this reduces the electromagnetic irradiation and on the other offers the possibility to break up this electrical or galvanic link GA by means of inductive or capacitive coupling and potential-free.

A terminating resistor R0 downstream of the line driver LD can be selected according to the characteristic impedances of the used line, in order to allow data to be transmitted also over long distances without reflection.

In order to, on the one hand, support inductive or capacitive coupling as mentioned above which is considered optimal, and optical data transmission for example, and on the other hand ensure synchronisation of the data stream on the receiving side, the below-shown coding/decoding system, which causes freedom from d.c. voltage of the generated serial signals, can be used in the multiplexer MUP according to FIG. 3B and in the demultiplexer DMP according to FIG. 3B:

Codes for $D_P$ & $D_N$: 0≙01
1≙10
Codes for $GPTO_{NX}$: 0≙00
1≙11
$D_P|D_N|G_1|11|D_P|D_N|G_1|00|D_P|D_N|G_2|00|D_P|D_N|G_2|00|$ . . .
Frame and Bit Position:
|XOR, XOR, XNOR, AND, XOR, XOR, XNOR, NOR|

The solution presented above according to the present invention permits full duplex data transmission for D-PHY-L[ow]P[ower] data and at the same time for a further number of general binary data PD, bundled via a line GA.

LIST OF REFERENCE NUMERALS

A circuit arrangement
E receiving arrangement
S transmission arrangement
AE output of the receiving arrangement E
AP application processor
AS output of the transmission arrangement S
AT output driver, in particular laser driver
AZ other or further or additional output of the transmission arrangement S
BPWMW binary/P[ulse]W[idth]M[odulation] converter
CD clock and data recovery unit
CE clock module of the receiving interface logic LE
CH0± first data line or first channel
CH1± second data line or second channel
CH2± third data line or third channel
CH3± fourth data line or fourth channel
CLK± clock line or clock channel
CS clock module of the transmitting interface logic LS
DD0± differential signal, in particular common-mode-based data signal on the first data line or the first channel CH0±
DD1± differential signal, in particular common-mode-based data signal on the second data line or the second channel CH1±
DD2± differential signal, in particular common-mode-based data signal on the third data line or the third channel CH2±
DD3± differential signal, in particular common-mode-based data signal on the fourth data line or the fourth channel CH3±
DF deframer
DK decoder, in particular 6b/5b-Decoderblock, of deframer DF DM demultiplexer
DMP demultiplexer in the transmission/receiving module TXRXE of the receiving arrangement E and in the transmission/receiving module TXRXS of the transmission arrangement S
DS deserialisation element or deserialiser
DU display unit
DV differential amplifier
EE input of the receiving arrangement E
ES input of the transmission arrangement S
EV input amplifier, in particular transimpedance amplifier
EZ other or further or additional input of the receiving arrangement E
FD photo diode
FR framer
GA electrical or galvanic link, in particular copper cable or electrical line arranged e.g. on a printed circuit board HS high speed
HSD0 single-ended logic-level-based data signal on the first data line or the first channel CH0±
HSD1 single-ended logic-level-based data signal on the second data line or the second channel CH1±
HSD2 single-ended logic-level-based data signal on the third data line or the third channel CH2±
HSD3 single-ended logic-level-based data signal on the fourth data line or the fourth channel CH3±
IE data-sink-related CSI and/or CSI-2 and/or CSI-3 and/or DSI and/or DSI-2 interface
IS data-source-related CSI and/or CSI-2 and/or CSI-3 and/or DSI and/or DSI-2 interface
KA camera
KO coder, in particular 5b/6 coder block of framer FR
LA laser
LD line driver
LE receiving interface logic
LP low power
LS transmitting interface logic
MU multiplexer
MUP multiplexer in the transmission/receiving module TXRXE of the receiving arrangement E and in the transmission/receiving module TXRXS of the transmission arrangement S
OM optical medium, in particular optical waveguide, e.g. glass fibre and/or plastic fibre
PD binary and/or parallel signals
PS clock generator, in particular phase-locked-loop, for example clock multiplier unit
PWMBW P[ulse]W[idth]M[odulation]/binary converter
R0 terminating resistor
R1 resistor
SA first weighted signal
SB second weighted signal
SC signal after differential amplifier DV
SE serialisation element or serialiser
SI common signal stream
TL clock line
TXRXE transmission/receiving module of receiving arrangement E
TXRXS transmission/receiving module of transmission arrangement S While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A circuit arrangement for transmitting both
single-ended logic-level-based data signals and clock signals, and
differential data signals and clock signals
between at least one transmission arrangement assignable to at least one data source and at least one receiving arrangement assignable to at least one data sink
in the form of at least one common signal stream serializing the single-ended, logic-level-based data and clock signals and the differential data and clock signals and/or
in the form of at least one signal stream, which comprises both the differential data and clock signals and single-ended logic-level-based data and clock signals,
wherein the circuit arrangement comprises at least one multiplexer and at least one binary P[ulse]W[idth]M[odulation] converter.

2. The circuit arrangement according to claim 1, wherein the common signal stream can be transmitted via at least one optical medium.

3. The circuit arrangement according to claim 1, wherein the signal stream comprising both the differential data signals and clock signals and the single-ended logic-level-based data and clock signals can be transmitted via at least one electrical or galvanic link.

4. The circuit arrangement according to claim 3, wherein the electrical or galvanic link
in the transmission arrangement has assigned to it at least one transmission/receiving module and
in the receiving arrangement has assigned to it at least one transmission/receiving module, by means of which the signal stream comprising both the differential data and clock signals and the single-ended logic-level-based data and clock signals can be delivered/received.

5. The circuit arrangement according to claim 4, wherein the transmission/receiving module comprises:
the at least one multiplexer for serializing the differential data and clock signals and the single-ended logic-level-based data and clock signals
the at least one binary P[ulse]W[idth]M[odulation] converter downstream of the multiplex for changing the serialized signal stream from a binary N[on]R[eturn-to]Z[ero] format into a pulse-width-modulated format,
at least one line driver downstream of the binary P[ulse]W[idth]M[odulation] converter and
at least one terminating resistor downstream of the line driver.

6. The circuit arrangement according to claim 5, wherein the transmission/receiving module comprises:
at least one differential amplifier downstream of the terminating resistor for subtracting at least two signals separated by the terminating resistor;
at least one P[ulse]W[idth]M[odulation] binary converter downstream of the differential amplifier for changing from pulse-width-modulated format into binary N[on]R[eturn-to]Z[ero] format and
at least one demultiplexer downstream of the P[ulse]W[idth]M[odulation] binary converter for deserializing into the differential data and clock signals and the single-ended logic-level-based data and clock signals.

7. The circuit arrangement according to claim 1, wherein the transmission arrangement comprises:
at least one input for the data and clock signals,
at least one transmission interface logic downstream of the input for picking up the data and clock signals,
at least one serializer downstream of the transmission interface logic for generating the common signal stream,
at least one clock generator provided downstream of a clock module of the transmission interface logic, upstream of the serializer and for generating at least one reference clock,
at least one output driver downstream of the serializer and
at least one output downstream of the output driver for transmitting the common signal stream to the receiving arrangement.

8. The circuit arrangement according to claim 7, wherein the serializer comprises:
at least one framer downstream of the transmission interface logic for generating at least one frame recognizable in the receiving arrangement for the common signal stream as well as at least one multiplexer downstream of the framer for generating the common signal stream.

9. The circuit arrangement according to claim 8, wherein both the single-ended, logic-level-based data signals and the differential data signals can be applied to the framer and in that the framer, by means of at least one coder, embeds the differential data signals in the stream of the single-ended, logic-level-based data signals.

10. The circuit arrangement according to claim 1, wherein the receiving arrangement comprises:
- at least one input for the common signal stream transmitted by the transmission arrangement,
- at least one input amplifier for picking up the common signal stream,
- at least one clock and data recovery unit for recovering the data signals and clock signals from the common signal stream,
- at least one clock module of at least one receiving interface logic downstream of the clock and data recovery unit,
- at least one deserializer downstream of the clock and data recovery unit for re-parallelizing the data signals and for assigning the re-parallelized data signals to the receiving interface logic and
- at least one output downstream of the receiving interface logic for the data signals and clock signals.

11. The circuit arrangement according to claim 10, wherein the deserializer comprises:
- at least one demultiplexer downstream of the clock and data recovery unit for re-parallelizing the data signals as well as
- at least one deframer downstream of the demultiplexer for assigning the re-parallelized data signals to the receiving interface logic.

12. The circuit arrangement according to claim 11, wherein the deframer separates the differential data signals by means of at least one decoder from the single-ended, logic-level-based data signals and assigns the re-parallelized data signals to the respective data lines.

13. A method for transmitting both
- single-ended logic-level-based data signals and clock signals, and
- differential data and clock signals,
- between at least one transmission arrangement assignable to at least one data source and at least one receiving arrangement assignable to at least one data sink
- in the form of at least one common signal stream serializing the single-ended logic-level-based data and clock signals and the differential data and clock signals and
- in the form of at least one signal stream on full-duplex basis, comprising both the differential data and clock signals and single-ended logic-level-based data and clock signals.

14. The method according to one of claim 13, wherein the differential data and clock signals and the single-ended logic-level-based data and clock signals are scanned at different frequencies.

* * * * *